United States Patent Office 3,305,387
Patented Feb. 21, 1967

3,305,387
GYPSUM CASTINGS AND METHOD OF
PRODUCING THE SAME
Richard S. Fraser and Paul Y. Jone, Seattle, Wash., assignors to Weyerhaeuser Company, Tacoma, Wash., a corporation of Washington
No Drawing. Filed May 16, 1963, Ser. No. 281,009
5 Claims. (Cl. 117—123)

This invention relates to the art of producing gypsum castings having improved surface strength and improved dimensional accuracy. In particular, the invention concerns castings which find application in the production of plastic tooling compositions wherein such properties are especially required.

A gypsum casting throughout its thickness is made up primarily of interbonded, hydrated calcium sulfate crystals and may include various other particles bonded together by the calcium sulfate crystals, such as finely divided silicon dioxide, clay, iron oxide, or calcium and magnesium carbonates. The strength of the casting is derived principally from the interbonding strength of the calcium sulfate crystals, however when other particles are present they may also increase the strength and serve as fillers.

Thermosetting resins are known to increase the overall strength of gypsum plaster castings when distributed uniformly throughout the mass of the plaster. Such castings are prepared by pre-mixing the resin with the dry gypsum or by adding the resin to the water-gypsum slurry during mixing. It has now been found that thermosetting resins can be used to substantially increase the surface and sub-surface strength of a gypsum casting and to provide resistance to surface degradation due to dehydration of the surface crystals. The product is distinguished from reinforced plaster containing uniformly distributed resin in that the surface and sub-surface crystal interbonding is reinforced by applying the resin to the surface of the casting. The resin penetrates a limited distance thus forming a concentration of resin beneath the surface. The invention is equally applicable to plaster containing uniformly distributed resin or to plaster without resin.

Retention of permeability is an important characteristic in castings that must be dried before use in that open pores must be preserved to permit moisture escape. In spite of the increased resin concentration near the surface the resin does not form a coating over the surface and does not seal the open pore structure, thus the permeability of the casting is substantially retained.

Gypsum is a well known naturally-occurring mineral consisting of the dihydrate of calcium sulfate

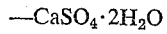
—$CaSO_4 \cdot 2H_2O$

It is rock-like in nature and occasionally occurs in relatively pure deposits, although it is more frequently found mixed with clay and other mineral impurities.

When gypsum is heated sufficiently water is driven off and a dehydrated calcium sulfate is obtained. The dehydrated product is then ground to a fine particle size and, after addition of fillers and agents to control the setting rate, is marketed for use as a casting plaster. The hemihydrate ($CaSO_4 \cdot \frac{1}{2}H_2O$) is commonly called plaster of Paris and is widely available.

To form a casting, plaster of Paris is mixed with sufficient water to make a pourable mixture. Shortly thereafter the hydrated crystal structure is formed which produces a coherent, interbonded crystal mass. This "setting" action is the basis for employment of gypsum as a base material in the manufacture of many articles of commerce, such as plaster castings, plaster walls and ceiling in buildings, various types of cement, and the like.

Of the many uses for gypsum this invention finds particular utility in making castings which in turn are used to make forming tools for plastics, especially those tools formed from thermosetting resins of various types.

Thermosetting and thermoplastic resins are used as base materials for various shaped articles. The articles are produced in a variety of ways, such as high pressure injection molding, casting, bag molding, machining, laminating, match plate molding, and the like. Large plastic items are conveniently shaped by forming them over heated tools having the configuration of the finished article.

The tool itself may be made of plastics, metals, or combinations of plastics and metals. While all-metal tools have certain advantages, they are frequently prohibitively expensive due to the machining and labor required in their manufacture. This is particularly true when a very complex shape is involved or high dimensional accuracy is required.

The art has recently turned to forming such tools of thermosetting plastic materials which contain metal powders or chips to provide strength and heat conductivity. Such tools frequently incorporate heating and cooling means within the mass of the tool itself. Resistance heating elements or conduits formed of tubing for conducting steam or water are usually employed.

Gypsum castings are frequently used as a mold for the thermosetting resin-metal mixture to form it into a required configuration. It is to this use for plaster castings that this invention is particularly directed.

The use of casting plaster for this purpose is advantageous because it faithfully reproduces the surface configuration and detail required in the tool, and provides high dimensional accuracy. The plaster casting must be strong throughout to withstand the handling required, and its surface and sub-surface must be especially strong to prevent surface cracking and chipping. The plaster must also be capable of withstanding heating at elevated temperatures without cracking.

The tools are formed by packing the uncured resin-metal mixture into the plaster mold. While the mixture is being positioned within the mold the various metal inserts such as electrical heating elements or tubing are positioned, and upon curing the resin the inserts become an integral part of the tool.

After the mixture is packed into the casting the assembly is cured by heating it to a temperature sufficient to initiate the resin-curing action. Heating is usually continued until the tooling composition is thoroughly cured, whereupon it is separated from the gypsum plaster mold and is then employed in fabricating various plastic items.

When plaster of Paris is mixed with water to form a castable slurry sufficient water must be present to make the mixture pourable. This is more water than is required to fully hydrate the calcium sulfate. The excess water (generally termed free water) distributed throughout the mass of the casting causes the casting to be weak, but its removal results in a substantial increase in the strength of the set gypsum casting. Castings containing free water are sometimes termed "green" castings. Removal of the free water is usually accomplished by exposing the casting to elevated temperatures, as in an oven.

Drying is facilitated by the open pores which extend inward from the surface of the casting because they provide a route by which free water can escape. The pores occur as a result of the crystal structure, however they vary in size, shape, and number depending on the exact nature of the plaster. In some forms of casting plaster the porous structure is increased by whipping air into the slurry before setting occurs.

To accomplish the bond reinforcement without sealing or coating the surface a solution of a thermosetting resin is applied to the surface of the gypsum casting and allowed to penetrate. Multiple applications of the resin solution may be made if it is desired to increase the resin in the surface and sub-surface portion of the casting. Thereafter the resin solvent is removed from the casting while the resin is cured to an insoluble state.

Any resin which is thermosetting in nature and which can be dissolved in a liquid or mixture of liquids may be used, however certain resin systems are preferred. Some resins may be applied in solution form to the "green" castings while other resin systems must be applied to dry castings.

The preferred resins are of the phenol-aldehyde, melamine-aldehyde, urea-aldehyde and resorcinol-aldehyde types. Various mixtures of the aforementioned resins are also usable, thus mixtures of phenol-aldehyde and resorcinol-aldehyde resins or melamine-aldehyde and urea-aldehyde may be used. The resins may be formulated with curing catalysts to thermoset at room temperature or at elevated temperatures. The preferred resin is the one-step type of phenol formaldehyde resin which is cured by application of heat.

The resin is applied to the casting as a low viscosity solution which is allowed to penetrate beneath the plaster surface before the resin is cured. The viscosity of the resin solution as applied to the surface of the casting may vary, but should be less than about 85 centistokes, preferably less than about 50 centistokes when measured at 25° C. If the resin solution is at first too viscous and appears to form a surface coating additional pure solvent may be brushed onto the surface to dilute the resin and encourage penetration. Alternatively, the stock resin solution may be simply diluted before application to the casting by adding a sufficient amount of solvent to reduce the viscosity below about 85 centistokes.

While water alone is a suitable solvent for many of the resins a mixed solvent which includes viscosity and surface tension reducing additives is preferred. Low-boiling resin solvents, such as methanol or acetone or similar substances, are therefore used in addition to the water to form the solvent. With some types of resins the water may have to be eliminated from the solvent to keep the resin in solution.

If it is desired to apply a resin solution to a green casting it is essential that the solution be miscible with the free water to avoid resin precipitation on the surface of the casting. Most alkaline phenolic or resorcinol resin solutions are sufficiently miscible as are urea and melamine resin solutions. If the solution is of limited water miscibility the addition of more methanol or acetone will usually assist in providing the required water miscibility.

It is advantageous to apply the resin solution to a gypsum casting containing free water because the casting may then be dried in an oven in the usual manner while the resin solvent is removed and the resin simultaneously cured. In this way a single drying operation will suffice for the production of a finished casting.

The drying temperature which is best for a particular casting is dependent on many factors, such as thickness of the casting, its free water content, production rate desired, dryer capacity, and the like. The exact temperature and time must therefore be determined by experiment. In general drying temperatures ranging from 200° F. to 450° F. have been found to be suitable.

The distance of resin penetration beneath the surface is variable depending on various factors existing when the resin solution contacts the plaster surface. In general penetration will be greater when the resin is applied to a green casting as compared to a dry casting. Other factors which influence the depth of penetration are the polymer size of the resin, the type of solvent employed, and the porosity or permeability of the plaster composition itself.

The penetration of resin into the surface is readily apparent when a colored resin such as a phenolic is used. A distinct border line between the reddish-brown cured resin and the white plaster composition is usually seen, although on occasion the resin penetration area will show a more intense coloration near the surface gradually diminishing in intensity and blending into the color of the plaster further beneath the surface. The penetration of colorless resins such as melamine and urea types are more difficult to observe.

The following examples describe the improved product of the invention and representative resins which may be employed in practising the invention.

*Example 1*

A phenol-formaldehyde resin was prepared from the following materials by reacting as described:

| Material: | Parts by weight |
| --- | --- |
| Phenol | 36.7 |
| Water | 4.0 |
| Aqueous formaldehyde solution (46.5% HCHO) | 39.9 |
| Aqueous sodium hydroxide solution (50% NaOH) | 1.4 |
| Toluene | 2.4 |
| Isopropyl alcohol | 107.8 |
| Methyl alcohol | 7.8 |

The phenol, water, formaldehyde solution and sodium hydroxide solution were placed in a resin kettle equipped with an agitator, cooling and heating jacket, and a condenser. The mixture was stirred and heated to 90° C. in 30 minutes, and then held at 90° C. to continue the reaction. The free formaldehyde content of the mixture was measured during the reaction period and after about 75 minutes total time it was found to be below 1%. Thereafter the mixture was cooled rapidly to 65° C. by gradually applying a vacuum to the kettle and distilling off water. The vacuum distillation was continued at 65° C. until the refractive index of the resin reached 1.600 measured @ 25° C. using an Abbe type refractometer and a sodium light source.

Thereafter the toluene and isopropyl alcohol were added and the resin cooled to 25° C. As the temperature passed 45° C. the methanol was added. The final resin solution viscosity was 14 centistokes when measured @ 25° C.

*Example 2*

A melamine-formaldehyde resin was prepared from the following materials by reacting as described:

| Material: | Parts by weight |
| --- | --- |
| Water | 17.7 |
| Methanol | 3.2 |
| Methanol solution of formaldehyde (55% HCHO—Methyl Formcel mfd. by Celanese Chemical Corp.) | 40.0 |
| Sucrose | 8.3 |
| Melamine | 30.7 |
| Aqueous sodium hydroxide solution (25% NaOH) | 0.1 |

The water, methanol, Methyl Formcel, sucrose, and melamine were placed in a resin kettle and while stirring the mixture was heated to 80° C. to 25 minutes. The temperature was maintained at 80° C. for 20 minutes and then reduced to 65° C. and maintained while the water dilutability [1] of the resin was checked periodically. When the water dilutability reached 4 to 1 (water to resin) the sodium hydroxide solution was added and the mixture cooled to 60° C. Thereafter a vacuum was created in the kettle and while keeping the temperature between 50°–60° C. distillation of solvent was commenced. A total of 24 parts by weight of distillate was collected.

The resin was then cooled to 25° C. and sufficient water added to adjust the viscosity to about 5 centistokes measured at 25° C.

*Example 3*

A urea-formaldehyde resin was prepared from the following materials by reacting as described:

| Material: | Parts by weight |
|---|---|
| Aqueous formaldehyde solution (46.5% HCHO) | 60.2 |
| Water | 5.0 |
| Urea | 23.9 |
| Sodium meta-bisulfite in water | 7.7 |

The formaldehyde and water were mixed in a resin kettle and the pH of the mixture was adjusted to 7.2–7.4 using a small amount of 20% sodium carbonate solution. The urea was then added and the mixture heated to 80° C. in 45 minutes and held at 80° C. for 10 minutes. During this period the pH of the mixture was kept within the range of 7.2–7.6 by small additions of 20% sodium carbonate solution or 50% formic acid solution.

The temperature was next raised to 95° C. and the pH adjusted to 4.0–4.5 by adding 50% formic acid solution. The temperature was retained at 95° C. until the resin viscosity reached 550 centistokes when measured at 25° C. Thereafter sufficient 20% sodium carbonate solution was added to raise the pH to 7.0–8.0. The slurry of sodium meta-bisulfite was then added and the temperature of the resin was increased to the boiling point (about 100° C.) and retained there until the critical solution temperature [2] of the resin dropped to 10° C. Thereafter the resin was cooled to 25° C. and the pH adjusted to 8.5 with the 20% sodium carbonate solution.

The above resin was then diluted with water containing about 10% of methanol until the solution viscosity was about 75 centistokes at 25° C.

In addition to the resins disclosed in the above examples the type generally known as resorcinol resins or resorcinol-phenol resins may be used. Such resins are disclosed in a number of United States patents, for example Nos. 2,385,370, 2,385,372, 2,385,373, and 2,385,374.

Resorcinol resins are normally made with insufficient aldehyde present to cause thermosetting, thus the resins are permanently fusible and soluble in methanol or water-methanol mixtures. Formaldehyde or various polymers of formaldehyde are then added to the fusible resorcinol resins to convert them to a thermosetting type.

When resorcinol resins are used in the present invention it is convenient to add aqueous formaldehyde to the resin solution to provide the needed aldehyde and simultaneously dilute the solution enough to insure penetration into the casting.

*Example 4*

Gypsum plaster castings were prepared using a casting plaster comprising about 65% calcium sulfate hemihydrate and about 35% filler. The dry mixture was mixed with water using a ratio of 5 parts of the plaster mixture to 3 parts of water.

The wet slurry was molded into a number of circular discs about six inches in diameter having a thickness of one inch and allowed to set at room temperature to form green gypsum castings.

Each of several of the green castings were then brush coated on one face with the resin solutions described in Examples 1–3, and others were coated with a resorcinol-phenol copolymer resin solution containing aqueous formaldehyde. The resin solutions penetrated rapidly beneath the surface following which the castings were placed in a heated air-circulating oven and dried about two hours at 300° F.

Examination of the dry castings showed no evidence of cracking and showed that the resin impregnated surface was substantially harder and more resistant to scratching than was the unimpregnated surface.

The castings were broken in half and an examination of the broken surface showed that the resins had penetrated up to about ⅛″ below the surface. In the cases of the resin of Example 1 and the resorcinol resin a distinct border line was visible between the reddish-brown resin impregnated portion near the surface and the underlying mass of dried plaster casting. Further examination made by gouging the plaster with a knife blade showed the surface and immediate sub-surface resin impregnated portion to be substantially harder than the rest of the casting.

Castings as described above are permeable to water. This may be illustrated by preparing castings as described, and following thorough oven drying and curing of the resin placing a film of water on the resin treated surface. If sufficient permeability has been retained the water will be absorbed rapidly in a manner similar to the way water is absorbed by blotting paper. If the resin formed a coating which closed most of the pores the water film will remain on the surface.

What is claimed is:

1. A method of improving the surface and subsurface strength of a permeable gypsum casting while retaining the casting in a permeable condition, comprising:
    forming an uncured permeable casting containing free water;
    applying a water-miscible solution of a thermosetting resin to the surface of the uncured casting, said solution having a viscosity less than about 85 centistokes measured at 25° C.;
    allowing the solution to penetrate beneath said surface; and removing the solvent and free water from the casting while curing said resin to an insoluble state.

2. The method as set forth in claim 1 wherein the solvent and free water are removed by heating the casting to a temperature of between 200° F. and 400° F.

3. The method as set forth in claim 2 wherein the water-miscible resin is a phenolic resin.

4. The method as set forth in claim 1 wherein the viscosity of said solution is less than about 50 centistokes measured at 25° C.

5. The method as set forth in claim 1 wherein the water-miscible resin solution is a thermosetting phenolic resin having a viscosity of about less than 50 centistokes measured at 25° C. and said solvent and free water are removed by heating the casting to a temperature of between 200° F. and 400° F.

---

[1] Water dilutability was measured by placing 10 ml. of the resin in a dry 100 ml. graduated cylinder. Water @ 25° C. was added from a wash bottle while the mixture was stirred. The water dilutability was the volume ratio of water added per ml. of resin when a distinct turbidity of precipitated resin was first noticed.

[2] Critical solution temperature is determined by diluting a sample of the resin to 10% solids content with water and cooling the diluted mixture until a distinct turbidity of precipitated resin is formed. The temperature at which the resin precipitates is the critical solution temperature.

References Cited by the Examiner

UNITED STATES PATENTS

| 1,160,363 | 11/1915 | Baekeland | 117—123 |
| 2,470,918 | 5/1949 | Chung | 117—123 |

(Other references on following page)

UNITED STATES PATENTS 2,983,630 5/1961 Anderson ........ 117—161 X
3,145,502 8/1965 Rubenstein ......... 117—123

FOREIGN PATENTS 217,602 9/1957 Australia.
425,742 3/1935 Great Britain.
549,009 11/1942 Great Britain.

References Cited by the Applicant

FOREIGN PATENTS 611,550 3/1935 Germany.

ALFRED L. LEAVITT, *Primary Examiner.*

W. L. SOFFIAN, *Assistant Examiner.*